(12) United States Patent
Miyamoto (10) Patent No.: US 11,280,474 B2
(45) Date of Patent: Mar. 22, 2022

(54) LIGHTING DEVICE

(71) Applicant: Yazaki Corporation, Tokyo (JP)

(72) Inventor: Hiroki Miyamoto, Makinohara (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 17/185,304

(22) Filed: Feb. 25, 2021

(65) Prior Publication Data

US 2021/0262637 A1 Aug. 26, 2021

(30) Foreign Application Priority Data

Feb. 25, 2020 (JP) .............................. JP2020-029772

(51) Int. Cl.

| | |
|---|---|
| *F21V 7/05* | (2006.01) |
| *B60Q 3/51* | (2017.01) |
| *B60Q 3/80* | (2017.01) |
| *B60Q 3/60* | (2017.01) |
| *B60Q 3/74* | (2017.01) |
| *F21V 23/00* | (2015.01) |
| *F21Y 113/10* | (2016.01) |
| *F21Y 115/10* | (2016.01) |

(52) U.S. Cl.
CPC .................. *F21V 7/05* (2013.01); *B60Q 3/51* (2017.02); *B60Q 3/60* (2017.02); *B60Q 3/74* (2017.02); *B60Q 3/80* (2017.02); *F21V 23/003* (2013.01); *F21Y 2113/10* (2016.08); *F21Y 2115/10* (2016.08)

(58) Field of Classification Search
CPC ........... F21V 7/05; F21V 23/003; B60Q 3/05; B60Q 3/51; B60Q 3/80; B60Q 3/60

USPC ......................................................... 362/516
See application file for complete search history.

(56) References Cited

U.S. PATENT DOCUMENTS

| | | | | |
|---|---|---|---|---|
| 5,803,579 A | * | 9/1998 | Turnbull ................ | F21S 41/143 362/516 |
| 8,998,466 B2 | * | 4/2015 | Wilfert ..................... | B60Q 3/76 362/511 |
| 11,034,292 B2 | * | 6/2021 | Glickman ................ | F21S 41/25 |
| 2005/0161586 A1 | | 7/2005 | Rains et al. | |
| 2009/0251912 A1 | | 10/2009 | Kino et al. | |
| 2011/0175527 A1 | * | 7/2011 | Ramer ...................... | F21V 7/05 315/32 |

(Continued)

FOREIGN PATENT DOCUMENTS

| | | |
|---|---|---|
| EP | 3182806 A1 | 6/2017 |
| JP | 2008-295534 A | 12/2008 |
| JP | 2016162480 A | 9/2016 |

*Primary Examiner* — Bryon T Gyllstrom
(74) *Attorney, Agent, or Firm* — Banner & Witcoff, Ltd.

(57) ABSTRACT

A lighting device includes a white LED, a full-color LED, and a reflecting portion. The reflecting portion reflects light from the white LED and the full-color LED. A microcomputer turns on the full-color LED to emit light containing a red light component while the white LED is on. Further, the white LED and the full-color LED are arranged so that reflected lights thereof reflected by the reflecting portion are mixed to perform illumination. Thereby, direct lights of the white LED and the full-color LED cannot be visually recognized. Further, light from the white LED with a lot of blue components is compensated with light containing a red component from the full-color LED, and spectral distribution can be made even and illumination close to that of natural light can be performed.

6 Claims, 6 Drawing Sheets

(56) References Cited

U.S. PATENT DOCUMENTS

| | | | | |
|---|---|---|---|---|
| 2012/0106188 A1* | 5/2012 | Takahashi | ............... | F21S 45/48 |
| | | | | 362/516 |
| 2013/0093362 A1* | 4/2013 | Edwards | ................. | F21K 9/232 |
| | | | | 315/313 |
| 2015/0198319 A1* | 7/2015 | Salter | ..................... | B60Q 3/217 |
| | | | | 362/293 |
| 2015/0291085 A1* | 10/2015 | Manning | ................. | F21S 43/14 |
| | | | | 362/516 |
| 2015/0335246 A1* | 11/2015 | Rains, Jr | ............... | F21V 23/003 |
| | | | | 362/231 |
| 2018/0283655 A1* | 10/2018 | Yamauchi | ................ | G02B 6/00 |

\* cited by examiner

LIGHTING DEVICE

CROSS-REFERENCE TO RELATED APPLICATIONS

This application is based on and claims priority under 35 USC 119 from Japanese Patent Application No. 2020-029772 filed on Feb. 25, 2020, the contents of which are incorporated herein by reference.

TECHNICAL FIELD

The present invention relates to a lighting device provided with a white light source.

BACKGROUND ART

Figure 5:
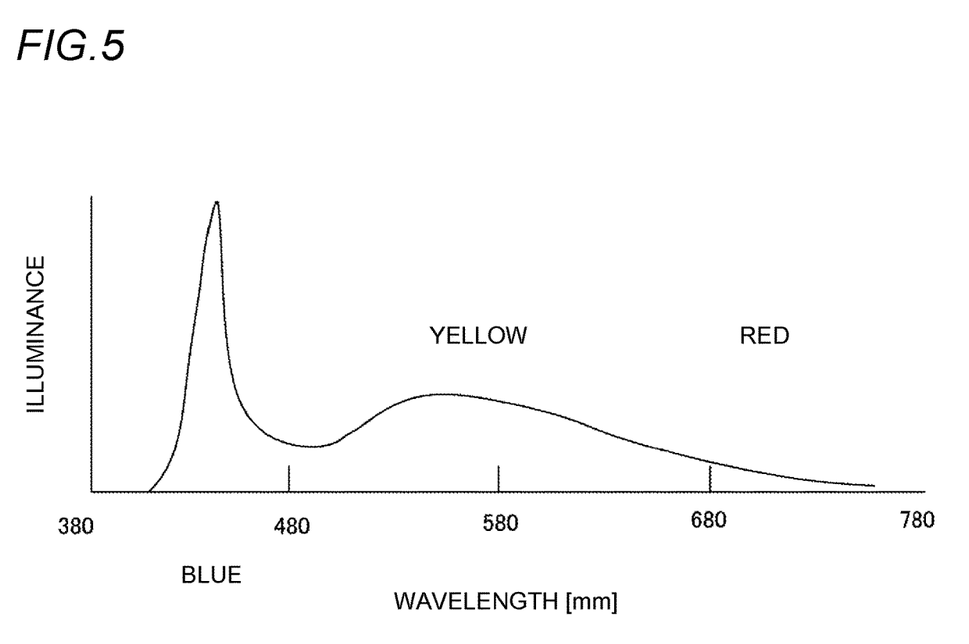
FIG. 5 is a graph illustrating an example of spectral distribution of a white LED illustrated in FIG. 1.

As the lighting device described above, a lighting device that illuminates a room with a white LED (white light source) has been proposed. However, since the white LED is composed of a blue LED and a yellow phosphor, a red light component is low in illuminance and spectral distribution of light is biased, as illustrated in FIG. 5. For this reason, color rendering property thereof is low and vividness thereof is low, as compared with that of natural light having no bias in the spectral distribution of light.

Further, as an example of the lighting device in the related art, a lighting device disclosed in Patent Literature 1 has been proposed.

CITATION LIST

Patent Literature

Patent Literature 1: JP-A-2008-295534

SUMMARY OF INVENTION

The present invention has been made in view of the above circumstances, and an object thereof is to provide a lighting device in which the color rendering property of illumination by a white light source is enhanced.

Solution to Problem

According to an embodiment, a lighting device according to the present invention includes a white light source, a full-color light source, a reflecting portion that reflects light from the white light source and the full-color light source, and a control unit that controls the white light source and the full-color light source. The lighting device performs illumination with reflected light from the reflecting portion. The control unit turns on the full-color light source while the white light source is on, and the white light source and the full-color light source are arranged so that reflected light of the white light source reflected by the reflecting portion and reflected light of the full-color light source reflected by the reflecting portion are mixed to perform illumination.

DESCRIPTION OF EMBODIMENTS

Specific embodiments according to the present invention will be described below with reference to the accompanying drawings.

Figure 1:
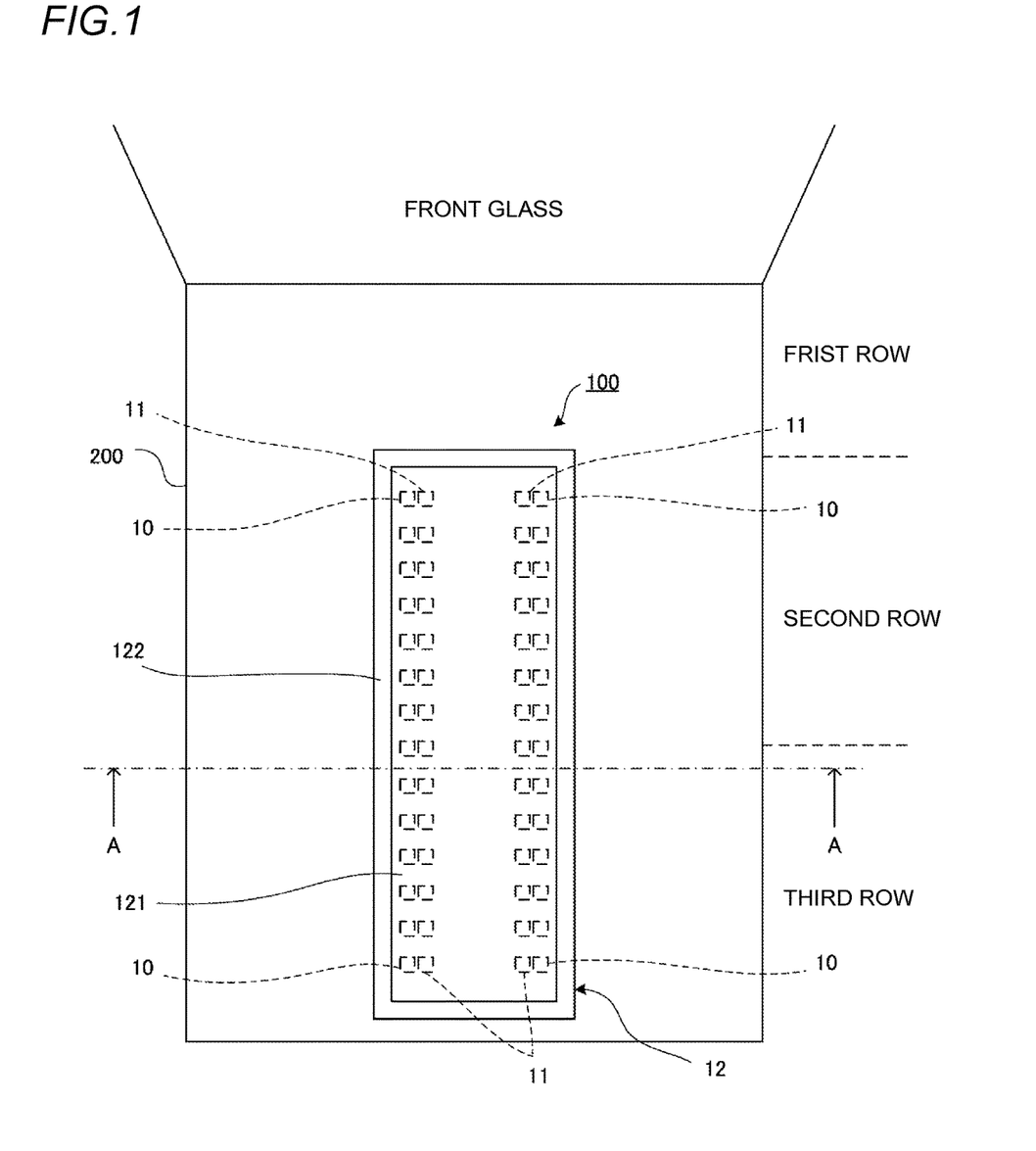
FIG. 1 is a diagram illustrating a ceiling of a vehicle to which an embodiment of a lighting device of the present invention is attached.

As illustrated in FIG. 1 and the like, a lighting device 100 is attached to a ceiling 200 of a vehicle and illuminates a vehicle interior. In the present embodiment, the lighting device 100 is attached to the ceiling 200 above seats in the second and third rows of the vehicle. The lighting device 100 includes a plurality of white LEDs (white light sources) 10, a plurality of full-color LEDs (full-color light sources) 11, an accommodating portion 12 that accommodates the white LEDs 10 and the full-color LEDs 11, and a microcomputer (hereinafter, μCOM) 13 (FIG. 4) serving as a control unit for controlling the white LEDs 10 and the full-color LEDs 11.

In the present embodiment, each white LED 10 includes a blue LED (not shown) and a yellow phosphor. Therefore, as illustrated in FIG. 5, in light from the white LED 10, a blue light component is extremely high in illuminance, and a red light component is low in illuminance. Each full-color LED 11 includes a red LED, a green LED, and a blue LED (not shown), and can emit light in full color.

Figure 2:
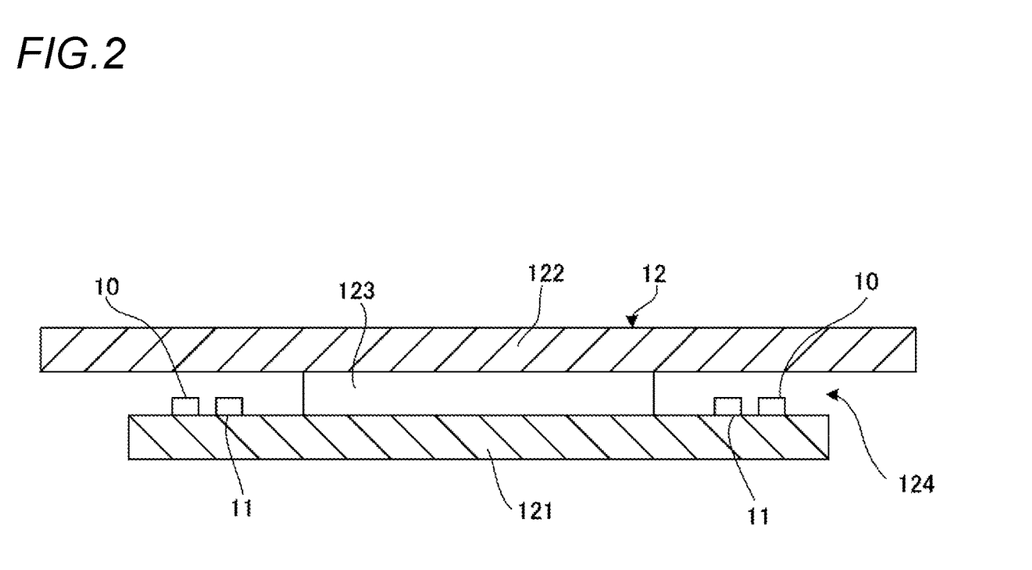
FIG. 2 is a cross-sectional view taken along a line A-A of FIG. 1.

As illustrated in FIG. 2, the accommodating portion 12 includes an LED mounting portion 121 on which the white LED 10 and the full-color LED 11 are mounted, a reflecting portion 122 provided on the ceiling 200 side of the LED mounting portion 121, and a supporting portion 123 provided between the LED mounting portion 121 and the reflecting portion 122.

In the present embodiment, the LED mounting portion 121 is provided in a rectangular plate shape elongated in a front-rear direction of the vehicle, as illustrated in FIG. 1. The white LED 10 and the full-color LED 11 are mounted on an upper surface of the LED mounting portion 121 (surface on the ceiling 200 side). In the present embodiment, the white LED 10 and the full-color LED 11 are arranged side by side in a plurality of sets at each of a pair of edge portions along the front-rear direction of the LED mounting portion 121. In addition, in the present embodiment, columns of the full-color LEDs 11 are arranged on the LED mounting portion 121 so as to be located closer to a center than columns of the white LEDs 10.

The reflecting portion 122 is provided in a rectangular plate shape elongated in the front-rear direction, which is slightly larger than the LED mounting portion 121, and is attached to the ceiling 200. Lights from the white LED 10 and the full-color LED 11 are emitted upward toward the reflecting portion 122, is reflected by the reflecting portion 122 and is directed downward, and indirectly illuminates the vehicle interior.

As illustrated in FIG. 2, the supporting portion 123 supports the reflecting portion 122 so that the LED mounting portion 121 and the reflecting portion 122 are spaced apart in an up-down direction. In the present embodiment, the supporting portion 123 is attached to a center of the LED mounting portion 121 and the reflecting portion 122.

Figure 3:
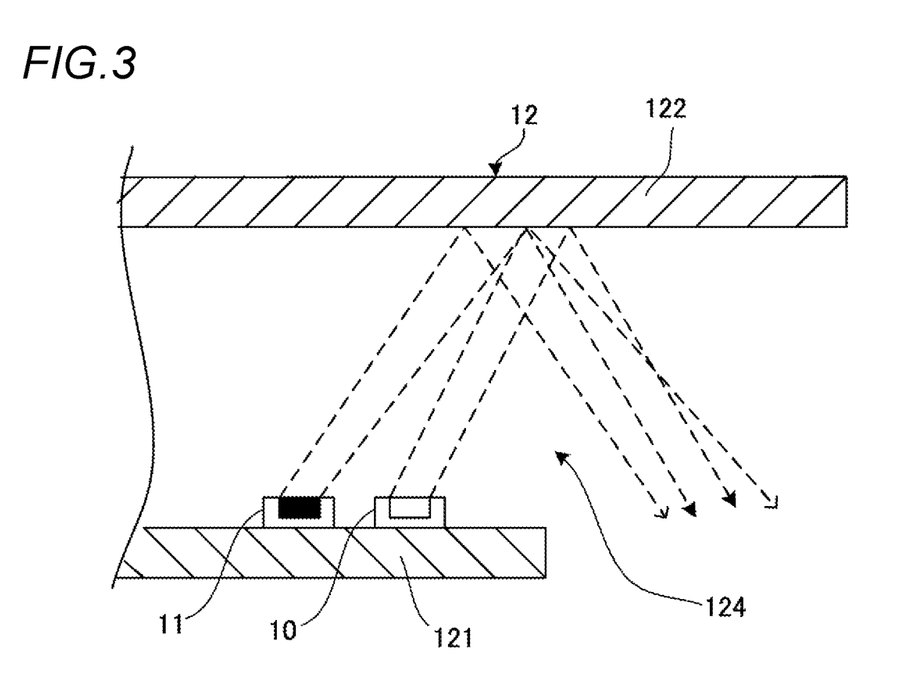
FIG. 3 is a partially enlarged view of FIG. 2.

As illustrated in FIG. 3, the accommodating portion 12 is provided with a gap 124 (opening) between the LED mounting portion 121 and the reflecting portion 122, and light from the white LED 10 and light from the full-color LED 11 are emitted into the vehicle interior through one (the same) gap 124. The white LED 10 and the full-color LED 11 are disposed at positions close to each other so that reflected light thereof reflected by the reflecting portion 122 is mixed to perform indirect illumination.

Figure 4:
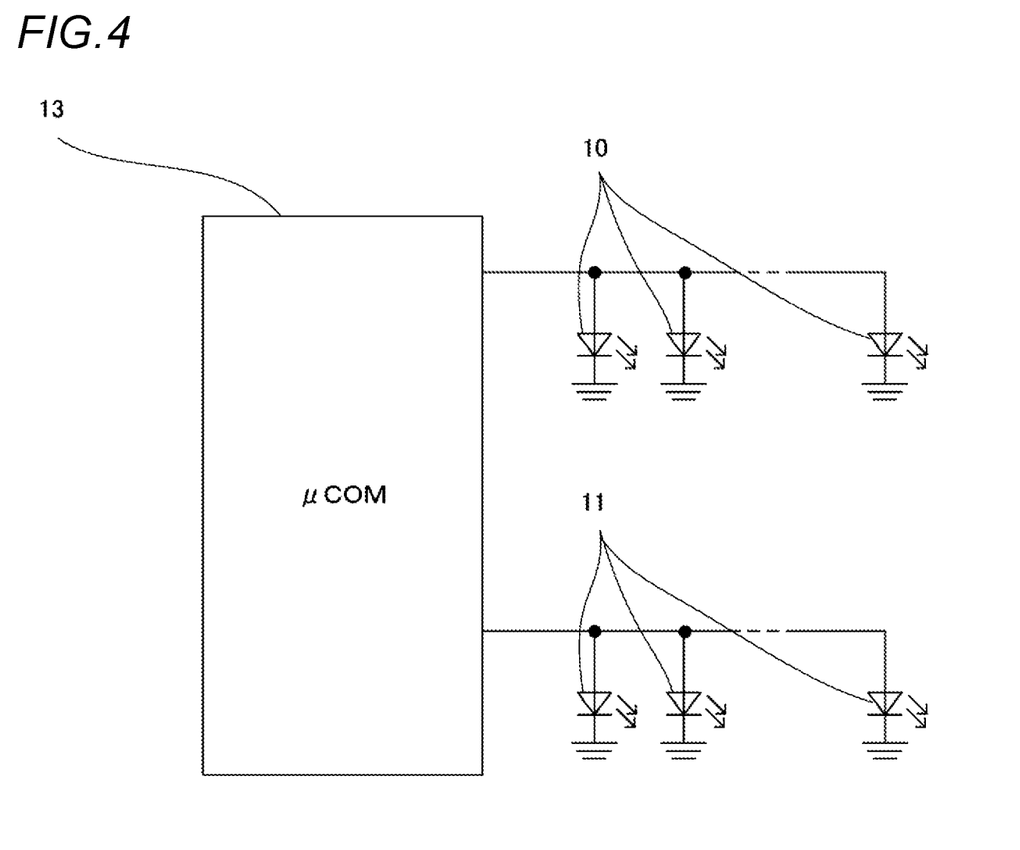
FIG. 4 is an electrical configuration diagram of the lighting device illustrated in FIG. 1.

As illustrated in FIG. 4, the plurality of white LEDs 10 described above are connected in parallel to each other and controlled by a μCOM 13. The plurality of full-color LEDs 11 described above are also connected in parallel to each other and controlled by the μCOM 13.

The μCOM 13 controls turning-on of the white LED 10 and the full-color LED 11 based on states of various switches and sensor outputs, information input from a high-order ECU, or the like. When it is determined, based on the states of the various switches, that full-color illumination needs to be performed, the μCOM 13 turns on only the full-color LED 11 and causes the full-color LED 11 to emit light with a predetermined illumination color. On the other hand, when it is determined that white-color illumination needs to be performed, the μCOM 13 turns on the white LED 10, and turns on the full-color LED 11 to emit light containing a red light component while the white LED 10 is on.

As illustrated in FIG. 5, in the light of the white LED 10, there is too much of a blue light component and a little of a red light component. By mixing the reflected light of the white LED 10 having a little of a red light component and the reflected light of the full-color LED 11 which is turned on to emit light containing a red light component, and emitting the mixed light to the vehicle interior to perform indirect illumination, the mixed light becomes light in which the red light component is compensated by the full-color LED 11. Further, by performing indirect illumination, direct light of the white LED 10 and the full-color LED 11 cannot be visually recognized. In other words, it is possible to realize vehicle interior illumination of the lighting device 100 as that of natural light having an almost even spectral distribution and having high color rendering property.

According to the embodiment described above, lights from both the white LED 10 and the full-color LED 11 are emitted from one gap 124 provided in the accommodating portion 12. This makes it possible to easily mix the light from the white LED 10 and the light from the full-color LED 11.

According to the embodiment described above, the μCOM 13 switches between full-color illumination for turning on only the full-color LED 11 and white-color illumination for turning on both the white LED 10 and the full-color LED 11. Accordingly, the full-color LED 11 used in full-color illumination can be used to enhance the color rendering property of illumination by the white LED 10 at the time of white-color illumination.

According to the embodiment described above, the reflecting portion 122 is provided on the ceiling 200 of the vehicle. Accordingly, color rendering property of illumination for the vehicle interior can be enhanced.

The present invention is not limited to the above embodiment, and modifications, improvements, and the like can be made as appropriate. In addition, the material, shape, size, number, arrangement position, and the like of each component in the above embodiment can be set as desired and are not limited as long as the present invention can be achieved.

According to the embodiment described above, the reflecting portion 122 is provided separately from the ceiling 200 and is attached to the ceiling 200, but the present invention is not limited thereto. The reflecting portion 122 may be provided integrally with the ceiling 200. That is, the reflecting portion 122 may be provided on the ceiling 200.

The arrangement of the white LED 10 and the full-color LED 11 is not limited to that illustrated in FIG. 1. The white LED 10 and the full-color LED 11 may be arranged so as to mix the light reflected by the reflecting portion 122.

Figure 6:
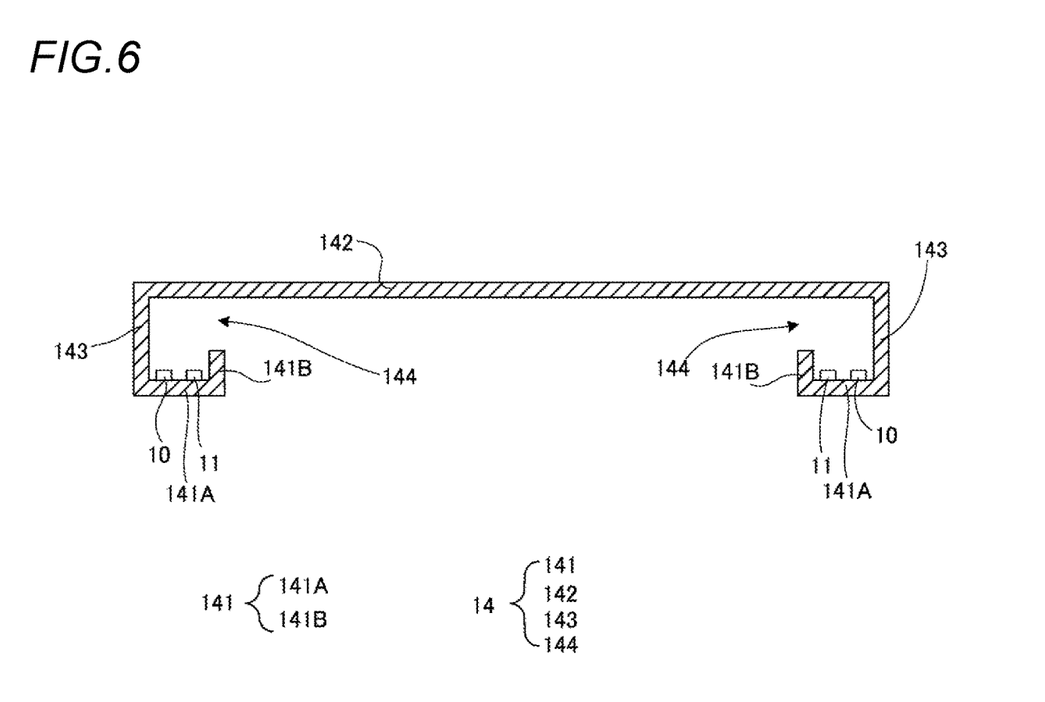
FIG. 6 is a cross-sectional view of a lighting device according to another embodiment.

In addition, according to the embodiment described above, the accommodating portion 12 is not limited to the one in the embodiment described above. For example, the accommodating portion 12 may be any one capable of accommodating the white LED 10 and the full-color LED 11 and performing indirect illumination in which light from the LEDs 10 and 11 is mixed. For example, the accommodating portion 12 may be configured as illustrated in FIG. 6. As illustrated in FIG. 6, an accommodating portion 14 includes two LED mounting portions 141, a reflecting portion 142, and two supporting portions 143.

Each of the two LED mounting portions 141 includes a mounting body portion 141A on which the white LED 10 and the full-color LED 11 are mounted, and a standing wall portion 141B standing upward from an end portion on a vehicle center side of the mounting body portion 141A. The two LED mounting portions 141 are provided in an elongated manner along a running direction of the vehicle and are spaced apart from each other in a width direction of the vehicle. The white LED 10 and the full-color LED 11 are arranged side by side in a plurality of sets along the running direction on an upper surface of the mounting body portion 141A.

The reflecting portion 142 is similar to the reflecting portion 122 of the embodiment described above. The supporting portion 143 is provided between each LED mounting portion 141 and the reflecting portion 142. In the present embodiment, the supporting portion 143 is attached to outer end portions of each LED mounting portion 141 and the reflecting portion 142 in the width direction of the vehicle. Lights from the white LED 10 and the full-color LED 11 are emitted from a gap 144 provided between the standing wall portion 141B and the reflecting portion 142.

Characteristics of the embodiments of the lighting device according to the present invention are briefly summarized in the following [1] to [5].

[1]

A lighting device (100), including:

a white light source (10);

a full-color light source (11);

a reflecting portion (122, 142) that reflects light from the white light source (10) and the full-color light source (11); and a control unit (13) that controls the white light source (10) and the full-color light source (11), in which the lighting device (100) performs illumination with reflected light from the reflecting portion (122, 142), in which the control unit (13) turns on the full-color light source (11) while the white light source (10) is on, and in which the white light source (10) and the full-color light source (11) are arranged so that reflected lights of the white light source and the full-color light source reflected by the reflecting portion (122, 142) are mixed to perform illumination.

[2]

The lighting device (100) according to the above [1], further including:

an accommodating portion (12, 14) that accommodates the white light source (10) and the full-color light source (11), in which lights from both the white light source (10) and the full-color light source (11) are emitted from one opening (124, 144) provided in the accommodating portion (12, 14).

[3]

The lighting device (100) according to [1], in which while the white light source (10) is on, the control unit (13) turns on the full-color light source (11) so that the full-color light source (11) emits light containing a red light component.

[4]

The lighting device (100) according to the above [1], in which the control unit (13) switches between full-color illumination for turning on only the full-color light source (11) and white-color illumination for turning on both the white light source (10) and the full-color light source (11).

[5]

The lighting device (100) according to the above [1], in which the reflecting portion (122, 142) are provided on a ceiling (200) of a vehicle.

According to the lighting device having the configuration of the above [1], the control unit turns on the full-color light source while the white light source is on. The white light source and the full-color light source are arranged so that the reflected light thereof reflected by the reflecting portion is mixed to perform indirect illumination, and direct light of the white light source and the full-color light source cannot be visually recognized. Accordingly, since spectral distribution can be made even and illumination close to that of natural light can be performed, it is possible to enhance color rendering property of illumination by the white light source.

According to the lighting device having the configuration of the above [2], lights from both the white light source and the full-color light source are emitted from one opening provided in the accommodating portion. This makes it possible to easily mix the light from the white light source and the light from the full-color light source.

According to the lighting device having the configuration of the above [3], while the white light source is on, the control unit turns on the full-color light source so that the full-color light source emits light containing a red light component. Accordingly, although a red light component is little with only the white light source, the red light component can be compensated by the full-color light source, and the spectral distribution can be further made even to enhance the color rendering property of illumination by the white light source.

According to the lighting device having the configuration of the above [4], the control unit switches between the full-color illumination for turning on only the full-color light source and the white-color illumination for turning on both the white light source and the full-color light source. Accordingly, the full-color light source used in full-color illumination can be used to enhance the color rendering property of illumination by the white light source at the time of white-color illumination.

According to the lighting device having the configuration of the above [5], the reflecting portion is provided on a roof of a vehicle. Accordingly, color rendering property of illumination for a vehicle interior can be enhanced.

In addition, according to the present embodiment, it is possible to provide a lighting device in which the color rendering property of illumination by a white light source is enhanced.

What is claimed is:

1. A lighting device comprising:
a white light source configured to only emit white light;
a full-color light source configured to emit light of a plurality of colors, the full-color light source being mounted closer to a center of the lighting device, in a first direction, than any white light source of the lighting device;
a reflecting portion that reflects light from the white light source and the full-color light source, the reflecting portion being mounted opposite to the white light source and full-color light source in a second direction orthogonal to a plane in which the white light source and the full-color light source are mounted; and
a control unit configured to separately control the white light source and the full-color light source,
wherein the lighting device performs illumination with reflected light from the reflecting portion,
wherein the control unit turns on the full-color light source while the white light source is on, and
wherein the white light source and the full-color light source are arranged so that reflected lights thereof reflected by the reflecting portion are mixed to perform indirect illumination, and direct light of the white light source and the full-color light source cannot be visually recognized.

2. The lighting device according to claim 1, further comprising:
an accommodating portion that accommodates the white light source and the full-color light source,
wherein lights from both the white light source and the full-color light source are emitted from one opening provided in the accommodating portion.

3. The lighting device according to claim 1,
wherein while the white light source is on, the control unit turns on the full-color light source so that the full-color light source emits light containing a red light component.

4. The lighting device according to claim 1,
wherein the control unit switches between full-color illumination for turning on only the full-color light source and white-color illumination for turning on both the white light source and the full-color light source.

5. The lighting device according to claim 1,
wherein the reflecting portion is provided on a ceiling of a vehicle.

6. The lighting device according to claim 1, further comprising a plurality of full-color light sources arranged in a plurality of columns, and
wherein the reflecting portion is disposed between at least two columns of the full-color light sources in the first direction.

* * * * *